United States Patent
Makar et al.

(10) Patent No.: US 9,704,213 B2
(45) Date of Patent: Jul. 11, 2017

(54) TEXTURE ELEMENT STREAMING

(71) Applicant: QUALCOMM Incorporated, San Diego, CA (US)

(72) Inventors: Mina Ayman Saleh Yanni Makar, San Diego, CA (US); Hongyu Jiang, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 14/458,560

(22) Filed: Aug. 13, 2014

(65) Prior Publication Data

US 2016/0048941 A1    Feb. 18, 2016

(51) Int. Cl.
| | | |
|---|---|---|
| *G06T 1/20* | (2006.01) | |
| *H04L 12/28* | (2006.01) | |
| *H04L 29/06* | (2006.01) | |
| *G06T 11/00* | (2006.01) | |
| *H04N 19/132* | (2014.01) | |
| *H04N 19/182* | (2014.01) | |
| *H04N 19/23* | (2014.01) | |
| *H04N 19/33* | (2014.01) | |

(52) U.S. Cl.
CPC ............... *G06T 1/20* (2013.01); *G06T 11/001* (2013.01); *H04L 12/2838* (2013.01); *H04L 65/602* (2013.01); *H04N 19/132* (2014.11); *H04N 19/182* (2014.11); *H04N 19/23* (2014.11); *H04N 19/33* (2014.11); *G06T 2200/16* (2013.01); *G06T 2210/32* (2013.01); *G06T 2210/36* (2013.01)

(58) Field of Classification Search
CPC .... H04N 19/132; H04N 19/182; H04N 19/23; H04L 65/602; G06T 11/001
See application file for complete search history.

(56) References Cited

U.S. PATENT DOCUMENTS

| | | | |
|---|---|---|---|
| 7,961,963 B2 | 6/2011 | Sun | |
| 8,564,606 B2 | 10/2013 | McKellar | |
| 2010/0001995 A1 | 1/2010 | Hamill et al. | |
| 2010/0260260 A1 | 10/2010 | Wiegand et al. | |
| 2013/0128965 A1 | 5/2013 | Zhang et al. | |

FOREIGN PATENT DOCUMENTS

WO    2012106644 A1    8/2012

OTHER PUBLICATIONS

Response to Written Opinion dated Oct. 13, 2015, from International Application No. PCT/US20151044843, filed on May 25, 2016, 19 pp.

(Continued)

*Primary Examiner* — Antonio A Caschera
(74) *Attorney, Agent, or Firm* — Shumaker & Sieffert, P.A.

(57) ABSTRACT

In one example, a method for transmitting video data includes outputting, by a source device to a sink device, graphical commands and one or more texture elements that are renderable into video data. In this example, outputting a particular texture element of the one or more texture elements includes streaming, by the source device and to the sink device, a plurality of stages that each respectively correspond to a respective subset of pixels of the particular texture element.

18 Claims, 8 Drawing Sheets

(56) References Cited

OTHER PUBLICATIONS

Second Written Opinion from International Application No. PCT/US2015/044843, dated Aug. 8, 2016, 9 pp.
Response to Second Written Opinion dated Aug. 8, 2016, from International Application No. PCT/US2015/044843, filed on Oct. 10, 2016, 7 pp.
Schwarz et al., "The Scalable Video Coding Extension of the H.264/AVC Standard," standards in a Nutshell, IEEE Signal Processing Magazine, Mar. 2008, pp. 135-141.
Eisert et al., "Low Delay Streaming of Computer Graphics," Image Procsessing, Oct. 12-15, 2008, pp. 2704-2707.
"AV Device Class Overview & AVFunction Definition," Universal Serial Bus Device Class Definition for Audio/Video Devices, Release 1.0, Dec. 7, 2011, 180 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
"Adam7 algorithm—Wikipedia, the free encyclopedia 11," Aug. 2, 2014, XP055218137, Retrieved from the Internet: URL: http://web.archive.org/web/20140802172548/http://en.wikipedia.orgfwiki/Adam7algorithm, 3 pp.
International Search Report and Written Opinion for International Application No. PCT/US2015/044843 date Oct. 13, 2015, 15 pp.
Media Content Distribution (MCD), "3D 1-30 Gaming Graphics Delivery Overview", Technical Report, European Telecommunications Standards Institute (ETSI),650, Route Des Lucioles ; F-06921 Sophia-Antipolis ; France, vol. 102 791 V1.1.1, Dec. 2010 , XP014061814, 19 pp.
Nave et al., "Games@large graphics streaming architecture" , Consumer Electronics, 2008. ISCE 2008. IEEE International Symposium on, IEEE, Piscataway, NJ, USA, Apr. 14, 2008 , XP031283619, ISBN: 978-1-4244-2422-1, 4 pp.

| A1 | A5 | A2 | A7 | B1 | B5 | B2 | B7 |
|----|----|----|----|----|----|----|----|
| A8 | A13 | A10 | A16 | B8 | B13 | B10 | B16 |
| A3 | A9 | A4 | A11 | B3 | B9 | B4 | B11 |
| A6 | A15 | A12 | A14 | B6 | B15 | B12 | B14 |
| C1 | C5 | C2 | C7 | D1 | D5 | D2 | D7 |
| C8 | C13 | C10 | C16 | D8 | D13 | D10 | D16 |
| C3 | C9 | C4 | C11 | D3 | D9 | D4 | D11 |
| C6 | C15 | C12 | C14 | D6 | D15 | D12 | D14 |

FIG. 3A

| A1' | A5' | A2' | A7' | B1' | B5' | B2' | B7' |
|-----|-----|-----|-----|-----|-----|-----|-----|
| A8' | A13' | A10' | A16' | B8' | B13' | B10' | B16' |
| A3' | A9' | A4' | A11' | B3' | B9' | B4' | B11' |
| A6' | A15' | A12' | A14' | B6' | B15' | B12' | B14' |
| C1' | C5' | C2' | C7' | D1' | D5' | D2' | D7' |
| C8' | C13' | C10' | C16' | D8' | D13' | D10' | D16' |
| C3' | C9' | C4' | C11' | D3' | D9' | D4' | D11' |
| C6' | C15' | C12' | C14' | D6' | D15' | D12' | D14' |

FIG. 3B

TEXTURE ELEMENT STREAMING

TECHNICAL FIELD

This disclosure relates to techniques for streaming video from a source device to a sink device.

BACKGROUND

Wireless display (WD) systems include a source device and one or more sink devices. The source device and each of the sink devices may be either mobile devices or wired devices with wireless communication capabilities. As mobile devices, for example, one or more of the source device and the sink devices may comprise mobile telephones, tablet computers, laptop computers, portable computers with wireless communication cards, personal digital assistants (PDAs), wireless gaming devices, portable media players, or other flash memory devices with wireless communication capabilities. Mobile devices may also include so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment.

SUMMARY

In general, this disclosure describes techniques for transmitting video data from a source device to a sink device by streaming a texture element in a plurality of stages.

In one example, a method for transmitting video data includes outputting, by a source device to a sink device, graphical commands and one or more texture elements that are renderable into video data. In this method, outputting a particular texture element of the one or more texture elements includes streaming, by the source device and to the sink device, a plurality of stages that each respectively correspond to a respective subset of pixels of the particular texture element.

In another example, a source device includes a memory, one or more processors, and at least one module executable by the one or more processors. In this example, the at least one module is executable by the one or more processors to output, to a sink device, graphical commands and one or more texture elements that are renderable into video data. In this example, the at least one module is executable by the one or more processors to output a particular texture element of the one or more texture elements by at least streaming, to the sink device, a plurality of stages that each respectively correspond to a respective subset of pixels of the particular texture element.

In another example, a source device includes means for outputting, to a sink device, graphical commands and one or more texture elements that are renderable into video data. In this example, the source device also includes means for outputting a particular texture element of the one or more texture elements by at least streaming, to the sink device, a plurality of stages that each respectively correspond to a respective subset of pixels of the particular texture element.

In another example, a non-transitory computer-readable storage medium stores instructions that, when executed, cause one or more processors of a source device to output, to a sink device, graphical commands and one or more texture elements that are renderable into video data. In this example, the instructions that cause the one or more processors to output a particular texture element of the one or more texture elements include instructions that cause the one or more processors to stream, to the sink device, a plurality of stages that each respectively correspond to a respective subset of pixels of the particular texture element.

In another example, a method for receiving video data includes receiving, by a sink device and from a source device, graphical commands and one or more texture elements that are renderable into video data. In this example, the method also includes receiving a particular texture element of the one or more texture elements by at least receiving, by the sink device and from the source device, a plurality of stages that each respectively correspond to a respective subset of pixels of the particular texture element.

In another example, a sink device includes a memory, one or more processors, and at least one module executable by the one or more processors. In this example, the at least one module is executable by the one or more processors to receive, from a source device, graphical commands and one or more texture elements that are renderable into video data. In this example, the at least one module is executable by the one or more processors to receive a particular texture element of the one or more texture elements by at least receiving, from the source device, a plurality of stages that each respectively correspond to a respective subset of pixels of the particular texture element.

In another example, a sink device includes means for receiving, from a source device, graphical commands and one or more texture elements that are renderable into video data. In this example, the sink device also includes means for receiving a particular texture element of the one or more texture elements by at least receiving, from the source device, a plurality of stages that each respectively correspond to a respective subset of pixels of the particular texture element.

In another example, a non-transitory computer-readable storage medium stores instructions that, when executed, cause one or more processors of a sink device to receive, from a source device, graphical commands and one or more texture elements that are renderable into video data. In this example, instructions that cause the one or more processors to receive a particular texture element of the one or more texture elements include instructions that cause the one or more processors to receive, from the source device, a plurality of stages that each respectively correspond to a respective subset of pixels of the particular texture element.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A and 3B are conceptual diagrams illustrating an example texture element which may be streamed from a source device to a sink device in a plurality of stages, in accordance with one or more techniques of this disclosure.

DETAILED DESCRIPTION

Figure 1:
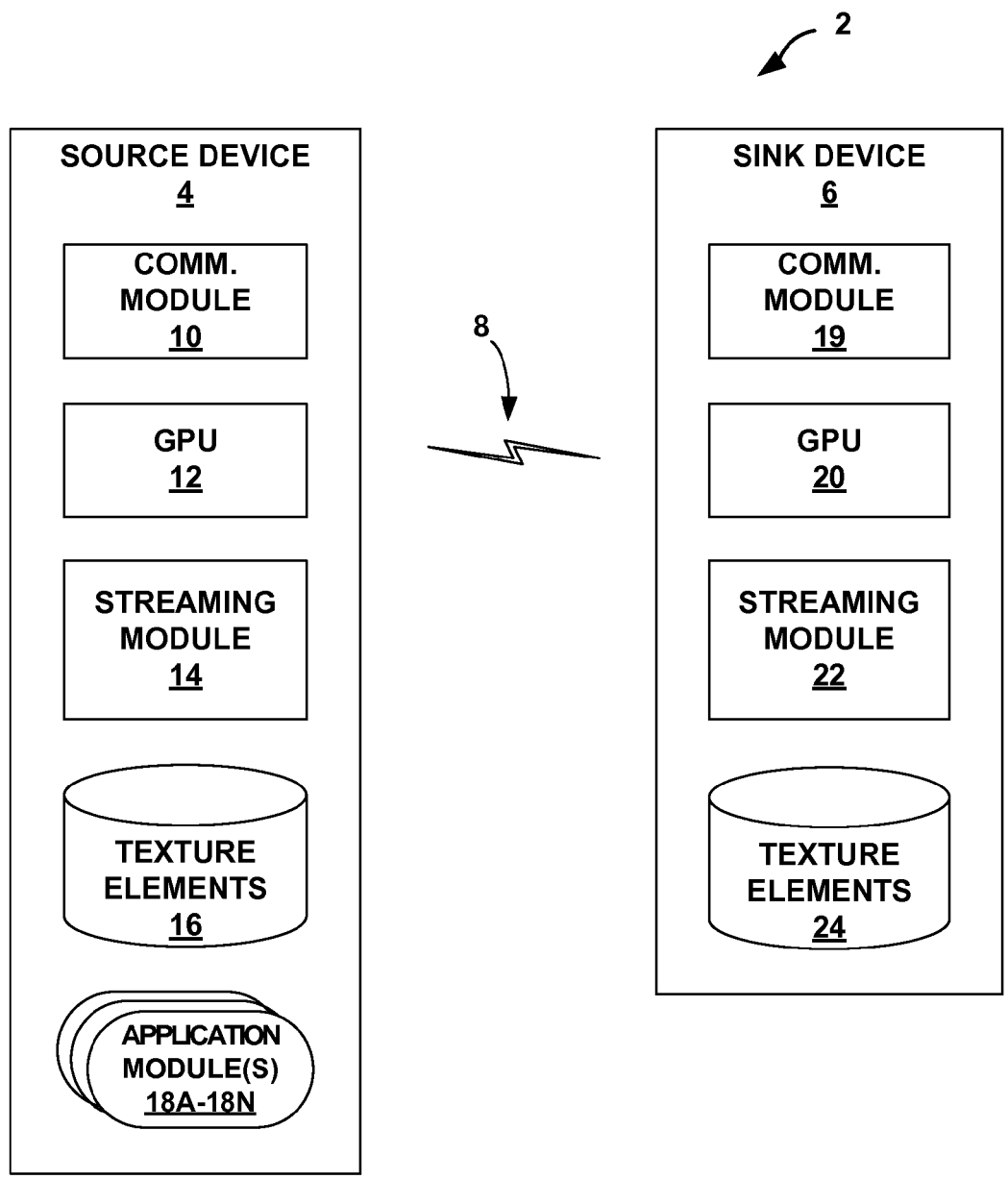
FIG. 1 is a conceptual diagram of an example wireless display (WD) system in which a source device is configured to stream texture elements to a sink device over a wireless communication channel, in accordance with one or more techniques of this disclosure.

This disclosure describes techniques for streaming video from a source device to a sink device. In some examples, a source device may stream video to a sink device by capturing constructed frames from a frame buffer of the source device, and transmitting the captured frames to the sink device, which may then displaying the images at a display of the sink device. This method may be referred to as a "pixel domain" transmission method. However, in some examples, it may not be desirable to use the pixel domain method due to the high average data rate required for transmission of the captured images.

Alternatively, in some examples, a "graphics domain" transmission method may be used by a source device to stream deconstructed video frames to a sink device. Graphics domain transmission may be accomplished by capturing display data at an input of a GPU of the source device in the form of graphics commands (e.g., OpenGL commands) and texture elements, transmitting the commands and texture elements to the sink device. A GPU of the sink device may render the commands and texture elements into displayable frames, and output the rendered frames at the display of the sink device. In some examples, the commands may cause the texture elements to be reused across multiple frames. As such, the texture elements may only need to be transmitted once and may be reused by the GPU to render subsequent frames (as opposed to the commands that cause the GPU to manipulate the texture elements which may be transmitted for each frame). Therefore, in some examples, such as at the start of each level in a gaming application, the graphics domain transmission method may result in high peak data rates because all of the texture elements for the level must be streamed before the sink device's GPU may begin rendering frames. Due to transmission channel constraints, the requirement that the texture elements be completely transmitted before frame rendering may result in delays which may erode the user experience.

In accordance with one or more techniques of this disclosure, as opposed to transmitting a texture element as a single unit, a source device may divide the texture element into a plurality of chunks and transmit the chunks to a sink device in stages that each include one or more of the chunks. A source device may create the chunks for a particular texture element by breaking the particular texture element into a plurality of blocks (e.g., 4×4 blocks, 8×8 blocks) and selecting a co-located pixel from each block to be included in each chunk.

As opposed to waiting until all of the chunks for the texture element have been received before beginning to render frames that include the particular texture element, the sink device may interpolate the not-yet-received pixels of the texture element based on one or more of the received chunks. As more chunks are received, quality of the texture element as rendered by the sink device may improve. In particular, interpolated pixels may be replaced by received pixels as additional chunks are received, which can improve the video quality and improved subsequent interpolations. In some examples, if a particular pixel is included in a received chunk, the value of the pixel included in the received chunk may be used to render the texture. In some examples, if a particular pixel is not included in any of the received chunks, the value of the pixel may be interpolated from the other pixel values in the received chunks. When all of the chunks have been received, the sink device may losslessly render the texture. By using interpolations for any pixels that are not yet received, latency can be improved.

FIG. 1 is a conceptual diagram of an example wireless display (WD) system in which a source device is configured to stream texture elements to a sink device over a wireless communication channel, in accordance with one or more techniques of this disclosure. As illustrated in FIG. 1, WD system 2 includes source device 4, sink device 6, and wireless communication channel 8.

Wireless communication channel 8 may be any channel capable of propagating communicative signals between source device 4 and sink device 6. In some examples, wireless communication channel 8 may be implemented in radio frequency communications in frequency bands such as the 2.4 gigahertz (GHz) band, the 5 GHz band, the 60 GHz band, or other frequency bands. In some examples, wireless communication channel 8 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

WD 2 may include source device 4 which may be configured to stream video data in the form of texture elements and graphical commands to a sink device over a wireless communication channel. For instance, source device 4 may stream texture elements 16 to sink device 6 over wireless communication channel 8. Examples of source device 4 may include, but are not limited to mobile devices such as smartphones or other mobile handsets, tablet computers, laptop computers, desktop computers, wearable computing devices (e.g., smart watches, visors, and the like), one or more processing units or other integrated circuits or chip sets, or other electronic devices. As illustrated in the example of FIG. 1, source device 4 may include communication module 10, graphics processing unit (GPU) 12, streaming module 14, texture elements 16, and application modules 18A-18N.

Source device 4 may include communication module 10 which may manage communications between source device 4 and one or more external devices, such as sink device 6. For instance, communication module 10 may exchange data with sink device 6 over wireless communication channel 8. As one example, communication module 10 may stream texture elements and graphical commands to sink device 6 over wireless communication channel 8 over a direct Wi-Fi connection. In some examples, communication module 10 may receive information to be transmitted from other components of source device 4. For example, communication module 10 may receive portions of texture elements 16 from streaming module 14.

Source device 4 may include GPU 12 which may render frames of video data based on one or more texture elements and graphical commands. Some examples of graphical commands which may be performed by GPU 12 include, but are not limited to, the DirectX® API by Microsoft®, the OpenGL® API by the Khronos group, and the OpenCL™ API. In some examples, GPU 12 may render frames of video data based on graphical commands and texture elements associated with one or more of application modules 18. For instance, GPU 12 may render frames of video data based on graphical commands and texture elements associated with an application module of application modules 18 for output at a display operatively coupled to or included in source device 4.

Source device 4 may include streaming module 14 which may be configured to stream video data to one or more external devices. For instance, streaming module 14 may stream video data in the form of graphical commands and texture elements to sink device 6. In some examples, streaming module 14 may capture the graphical commands and/or texture elements 16 at an input of GPU 12. In some examples, as opposed to outputting a particular texture element of texture elements 16 as a single unit, streaming module 14 may divide the particular texture element into a plurality of stages that each correspond to a subset of pixels of the particular texture element.

Source device 4 may include application modules 18 which may each represent an application provided by an entity that manufactures source device 4 or software operating on source device 4 or an application developed by a third-party for use with source device 4. Examples of application modules 18 may include applications for gaming, shopping, travel routing, maps, audio and/or video presentation, word processing, spreadsheets, voice and/or calls, weather, etc.

Source device 4 may include texture elements 16 which may be utilized by a GPU to render frames of video data. In some examples, one or more of texture elements 16 may be associated with a particular application module of application modules 18. For instance, where a gaming application of application modules 18 entails the slicing of falling fruit (e.g., watermelons, avocados, pineapples, etc.), example texture elements of texture elements 16 that may be associated with the gaming application include a graphical representation of each of the types of fruit. In some examples, texture elements 16 may be stored in a plurality of formats. Some example formats include, but are not limited to, RGBα 8888, RGBα 4444, RGBα 5551, RGB 565, Yα 88, and α 8.

WD 2 may include sink device 6 which may be configured to receive video data in the form of texture elements and graphical commands from a source device over a wireless communication channel. For instance, sink device 6 may receive texture elements 24 from source device 4 over wireless communication channel 8. Examples of sink device 6 may include, but are not limited to mobile devices such as smartphones or other mobile handsets, tablet computers, laptop computers, desktop computers, wearable computing devices (e.g., smart watches, visors, and the like), televisions, monitors, one or more processing units or other integrated circuits or chip sets, or other electronic devices. As illustrated in the example of FIG. 1, sink device 6 may include communication module 19, graphics processing unit (GPU) 20, streaming module 22, and texture elements 24.

Sink device 6 may include communication module 19 which may manage communications between sink device 6 and one or more external devices, such as source device 4. In some example, communication module 19 may perform operations similar to communication module 10 of source device 4. For instance, communication module 19 may exchange data with source device 4 over wireless communication channel 8. As one example, communication module 19 may receive graphical commands and texture elements from source device 4 over a direct Wi-Fi connection. In some examples, communication module 19 may provide received information to other components of sink device 6. For example, communication module 19 may provide received graphical commands and texture elements to streaming module 22.

Sink device 6 may include GPU 20 which may perform operations similar to GPU 12 of source device 4. For instance, GPU 20 may render frames of video data based on one or more texture elements and graphical commands. In some examples, GPU 20 may be capable of performing the same graphical commands as GPU 12. Some examples of graphical commands which may be performed by GPU 20 include, but are not limited to, the DirectX® API by Microsoft®, the OpenGL® API by the Khronos group, and the OpenCL™ API. In some examples, GPU 20 may render frames of video data based on graphical commands and texture elements received from one or more other components of sink device 6, such as streaming module 22. For instance, GPU 20 may render frames of video data based on graphical commands and texture elements associated received from streaming module 22 for output at a display operatively coupled to or included in sink device 6.

Sink device 6 may include streaming module 22 which may be configured to receive streaming video data from one or more external devices. For instance, streaming module 22 may receive streaming video data in the form of graphical commands and texture elements from source device 4. In some examples, as opposed to receiving a particular texture element of texture elements 24 as a single unit, streaming module 22 may receive a plurality of stages that each correspond to a subset of pixels of the particular texture element. In such examples, as opposed to waiting until every stage of the plurality of stages has been received, streaming module 22 may interpolate pixels of the particular texture element represented by one or more non-received stages of the plurality of stages based on pixels of the particular texture element represented by one or more received stages of the plurality of stages to generate an interpolated version of the particular texture element. In this way, streaming module 22 may successively interpolate pixels of the particular texture element represented by one or more non-received stages e.g., as successive stages are received.

Sink device 6 may include texture elements 24 which may be utilized by a GPU to render frames of video data. In some examples, such as where a particular texture element is received in a plurality of stages, texture elements 24 may store the received stages and the pixels interpolated based on the received stages.

A user of source device 4 may desire to stream video from source device 4 to sink device 6. For instance, where a size of a display of source device 4 is smaller than a size of a display of sink device 6, the user of source device 4 may desire to utilize the larger display of sink device 6 to output the video. However, it may not be desirable to transmit constructed frames of video data from source device 4 to sink device 6, e.g., due to bandwidth restrictions, processing power, and the like. In accordance with one or more techniques of this disclosure, streaming module 14 source device 4 may output graphical commands and one or more texture elements to streaming module 22 of sink device 6 via wireless communication link 8 in order to cause GPU 20 of sink device 6 to render frames of video data. In this way, as opposed to streaming video data in the pixel domain, source device 4 may stream video data to sink device 6 in the graphics domain, e.g., by streaming graphical commands and texture elements.

In some examples, the graphical commands may cause GPU 20 to reuse a particular texture element across multiple frames. As such, source device 4 may transmit a particular texture element to sink device 6 once and the particular texture element may be reused by GPU 20 to render subsequent frames. However, in some examples, it may not be desirable for source device 4 to transmit a texture element as a single unit. In accordance with one or more techniques of this disclosure, streaming module 14 may, as opposed to outputting a particular texture element as a single unit, output a plurality of stages that each correspond to a subset of pixels of the particular texture element.

Figure 2:
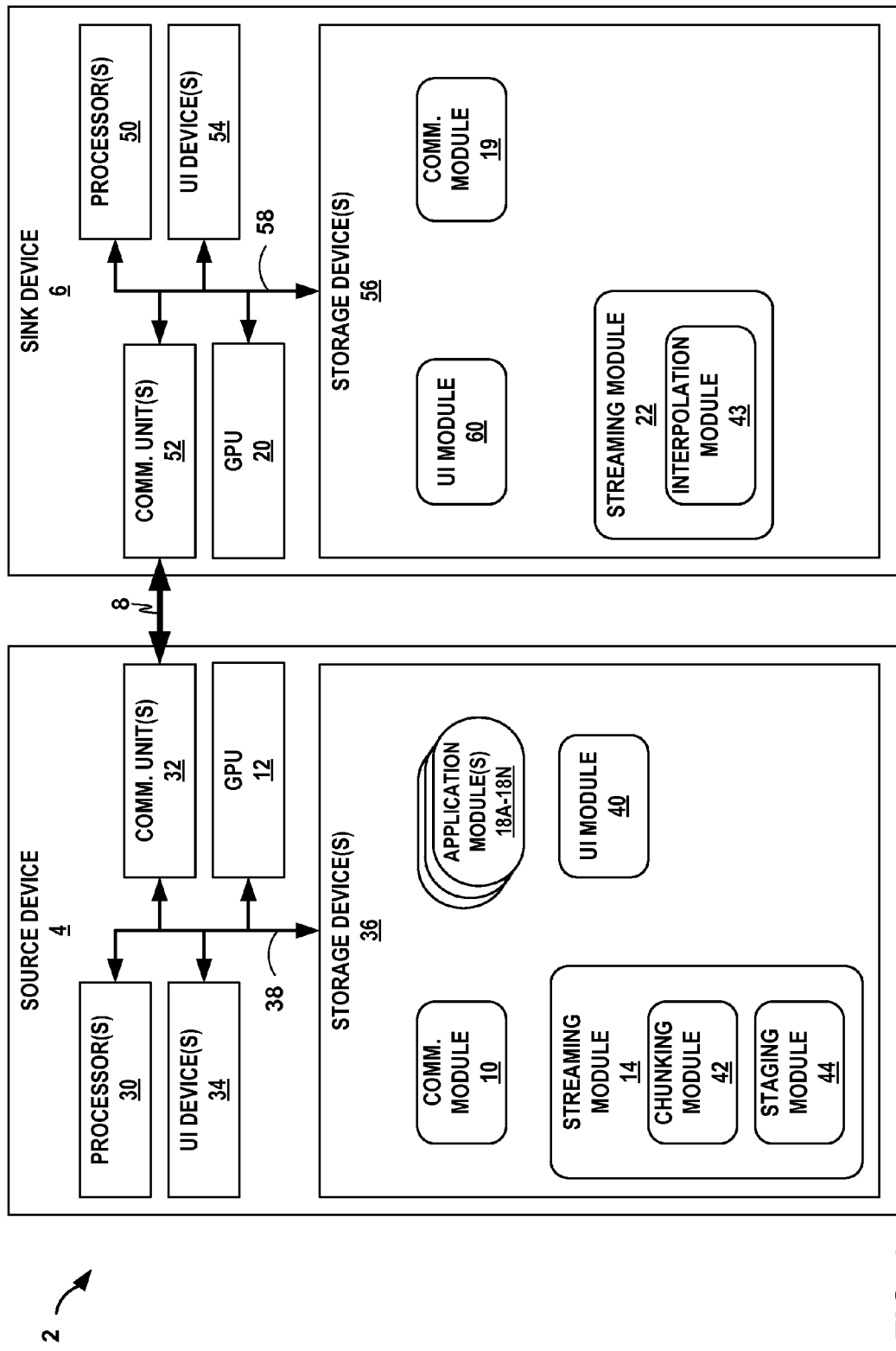
FIG. 2 is a block diagram illustrating further details of one example of source device 4 and sink device 6 of FIG. 1 in which source device 4 is configured to stream video to sink device 6 over wireless communication channel 8, in accordance with one or more techniques of the present disclosure.

FIG. 2 is a block diagram illustrating further details of one example of source device 4 and sink device 6 of FIG. 1 in which source device 4 is configured to stream video to sink device 6 over wireless communication channel 8, in accordance with one or more techniques of the present disclosure.

As illustrated in FIG. 2, source device 4 may include one or more processors 30, one or more communication units 32, one or more user interface (UI) devices 34, and one or more storage devices 36. Each of components 30, 32, 34, and 36 may be interconnected (physically, communicatively, and/or operatively) via communication channels 38 for inter-component communications. In some examples, communication channels 38 may include a system bus, network connection, interprocess communication data structure, or any other channel for communicating data. One or more of storage devices 36, in some examples, may include communication module 10, streaming module 14, texture elements 16, one or more application modules 18A-18N (collectively, "application modules 18"), and UI module 40.

Processors 30, in one example, are configured to implement functionality and/or process instructions for execution within source device 4. For example, processors 30 may be capable of processing instructions stored in one or more of storage devices 36. Examples of processors 30 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Source device 4, in some examples, also includes ones or more communication units 32. Source device 4, in one example, utilizes one or more communication units 32 to communicate with external devices via one or more networks, such as one or more wireless networks. One or more of communication units 32 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, source device 4 utilizes communication unit 32 to wirelessly communicate with an external device. For instance, source device 4 may utilize communication unit 32 to wirelessly communicate with communication unit 52 of sink device 6 over wireless communication channel 8. In some examples, communication unit 32 may receive input from other components of source device 4, such as communication module 10, that causes communication unit 32 to wirelessly communicate with an external device.

Source device 4, in some examples, may also include one or more UI devices 34. In some examples, one or more of UI devices 34 can be configured to output content, such as video data. For instance, a display of UI devices 34 may be configured to display frames of video data rendered by GPU 12. In addition to outputting content, one or more of UI devices 34 may be configured to receive tactile, audio, or visual input. Some examples of UI devices 34 include video displays, speakers, keyboards, touch screens, mice, cameras, and the like.

Source device 4, in some examples, may also include UI module 40. UI module 40 can perform one or more functions to receive, content, such as UI data from other components associated with source device 4 and cause one or more of UI devices 34 to output the content. In some examples, UI module 40 may be configured to receive an indication of input, such as user input, and send the indications of the input to other components associated with source device 4, such as streaming module 14.

One or more storage devices 36 may be configured to store information within source device 4 during operation. One or more of storage devices 36, in some examples, may comprise a computer-readable storage medium. In some examples, one or more of storage devices 36 may comprise a temporary memory, meaning that a primary purpose of one or more of storage devices 36 is not long-term storage. One or more of storage devices 36, in some examples, may comprise a volatile memory, meaning that one or more of storage devices 36 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 36 is used to store program instructions for execution by processors 30. One or more of storage devices 36, in one example, may be used by software or modules running on source device 4 (e.g., communication module 10, streaming module 14, application modules 18, and UI module 40) to temporarily store information during program execution.

One or more of storage devices 36, in some examples, may also include one or more computer-readable storage media. One or more of storage devices 36 may further be configured for long-term storage of information. In some examples, one or more of storage devices 36 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As illustrated in FIG. 2, sink device 6 may include one or more processors 50, one or more communication units 52, one or more user interface (UI) devices 54, and one or more storage devices 56. Each of components 50, 52, 54, and 56 may be interconnected (physically, communicatively, and/or operatively) via communication channels 58 for inter-component communications. In some examples, communication channels 58 may include a system bus, network connection, interprocess communication data structure, or any other channel for communicating data. One or more of storage devices 56, in some examples, may include communication module 19, streaming module 22, texture elements 24, and UI module 60.

Processors 50, in some examples, may be configured to implement functionality and/or process instructions for execution within sink device 6. For example, processors 50 may be capable of processing instructions stored in one or more of storage devices 56. Examples of processors 50 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Sink device 6, in some examples, also includes ones or more communication units 52. Sink device 6, in one example, utilizes one or more of communication units 52 to communicate with external devices via one or more networks, such as one or more wireless networks. One or more of communication units 52 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, sink device 6 utilizes communication unit 52 to wirelessly communicate with an external device. For instance, sink device 6 may utilize communication unit 52 to wirelessly communicate with communication unit 32 of source device 4 over wireless communication channel 8. In some examples, communication unit 52 may provide received data to other components of sink device 6, such as communication module 19.

Sink device 6, in some examples, may also include one or more UI devices 54. In some examples, one or more of UI devices 54 can be configured to output content, such as video data. For instance, a display of UI devices 54 may be configured to display frames of video data rendered by GPU 20. In addition to outputting content, one or more of UI devices 54 may be configured to receive tactile, audio, or visual input. Some examples of UI devices 54 include video displays, speakers, keyboards, touch screens, mice, cameras, and the like.

Sink device 6, in some examples, may also include UI module 60. UI module 60 can perform one or more functions to receive, content, such as UI data from other components associated with sink device 6 and cause one or more of UI devices 54 to output the content. In some examples, UI module 60 may be configured to receive an indication of input, such as user input, and send the indications of the input to other components associated with sink device 6, such as streaming module 14.

One or more storage devices 56 may be configured to store information within sink device 6 during operation. One or more of storage devices 56, in some examples, may comprise a computer-readable storage medium. In some examples, one or more of storage devices 56 may comprise a temporary memory, meaning that a primary purpose of one or more of storage devices 56 is not long-term storage. One or more of storage devices 56, in some examples, may comprise a volatile memory, meaning that one or more of storage devices 56 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 56 is used to store program instructions for execution by processors 50. One or more of storage devices 56, in one example, may be used by software or modules running on sink device 6 (e.g., communication module 19, streaming module 22, and UI module 60) to temporarily store information during program execution.

One or more of storage devices 56, in some examples, may also include one or more computer-readable storage media. One or more of storage devices 56 may further be configured for long-term storage of information. In some examples, one or more of storage devices 56 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

FIGS. 3A and 3B are conceptual diagrams illustrating an example texture element which may be streamed from a source device to a sink device in a plurality of stages, in accordance with one or more techniques of this disclosure. Specifically, FIG. 3A illustrates example texture element 100 and FIG. 3B illustrates interpolated texture element 100'. While illustrated in FIGS. 3A and 3B as an 8×8 texture element, other sizes of texture element 100 are possible. For instance, texture element 100 may be 4×4, 4×8, 16×16, 20×20, . . . , 1024×1024, etc.

Referring now to FIGS. 2 and 3 and in accordance with one or more techniques of this disclosure, source device 4 may stream video to sink device 6 in the form of graphical commands and texture elements. As discussed above, in some examples, as opposed to transmitting a texture element, such as texture element 100 as a single unit, streaming module 14 may transmit the texture element as a plurality of stages that each correspond to a subset of pixels of the texture element.

For instance, responsive to capturing texture element 100 and graphical commands for a first frame of a plurality of frames, streaming module 14 may determine whether or not to transmit texture element 100 as a single unit or as plurality of stages. In some examples, streaming module 14 may transmit texture element 100 as a plurality of stages where a size of texture element 100 is greater than a size threshold (e.g. 16 kilo-bytes, 512 kilo-bytes, 1 mega-byte). In some examples, the size threshold may be determined based on one or more conditions of wireless communication channel 8, such as the bandwidth of wireless communication channel 8.

In any case, responsive to determining to transmit texture element 100 as a plurality of stages, chunking module 42 of streaming module 14 may divide texture element 100 into a plurality of chunks. For instance, chunking module 42 may determine a plurality of blocks that each respectively correspond to a respective plurality of pixels of the particular texture element. As illustrated in FIG. 3, chunking module 42 may divide 8×8 texture element 100 into four 4×4 blocks (i.e., 102A-102D, collectively "blocks 102").

In some examples, such as where the dimensions of the texture element being transmitted are not integer multiples of the dimensions of the blocks being used, chunking module 42 may pad the texture element with rows and/or columns of zero-value pixels such that the dimensions of the texture element become integer multiples of the dimensions of the block being used. For instance, when dividing a 70×64 texture element into a plurality of 8×8 blocks, chunking module 42 may pad the right side of the texture element with two columns of zero-value pixels such that the dimensions of the texture element become 72×64 (which are both integer multiples of eight, the dimension of the blocks), Chunking module 42 may then determine the plurality of chunks based on the determined plurality of blocks. In some examples, chunking module 42 may determine the plurality of chunks such that each chunk respectively corresponds to a respective collocated pixel from each block of the plurality of blocks. As illustrated in FIG. 3, chunking module 42 may determine that a first chunk includes pixels from a first position, such as the top left pixel, of blocks 102 (i.e., A1, B1, C1, and D1); a second chunk includes pixels from a second position, such as the third pixel along the top row, of each block as a second chunk (i.e., A2, B2, C2, and D2); . . . ; and a sixteenth chunk includes pixels from a sixteenth position, such as the fourth pixel along the second row, of each block as a second chunk (i.e., A16, B16, C16, and D16). In any case, chunking module 42 may output an indication of the determined chunks to staging module 44.

Staging module 44 may assign the chunks to a particular stage of a plurality of stages. In some examples, staging module 44 may assign the chunks to the stages based on one or more conditions of wireless communication channel 8, such as the bandwidth of wireless communication channel 8, the size of the chunks, and/or a status of a buffer of sink device 6. For instance, staging module 44 may assign the first chunk to a first stage and output, at a first time, the first stage and the graphical commands for the first frame to communication module 10 for transmission to sink device 6 via wireless communication channel 8.

Responsive to receiving, via communication module 19, the first stage of the plurality of stages and the graphical commands for the first frame, streaming module 22 may cause GPU 20 to render the first frame. For instance, streaming module 22 may output the graphical commands for the first frame and an interpolated version of texture element 100 to GPU 20. In some examples, interpolation module 43 of streaming module 22 may determine the interpolated version of texture element 100 (i.e., 100') by interpolating pixels of texture element 100 represented by one or more non-received stages of the plurality of stages based on pixels of texture element 100 represented by the first stage. For instance, where the first stage includes the first chunk (i.e., pixels A1, B1, C1, and D1), interpolation module 43 may interpolate the pixels of texture element 100 represented by one or more non-received stages (i.e., pixels A2'-A16', B2'-B16', C2'-C16', and D2'-D16'). In some examples, if a particular pixel is included in a received chunk, the value of the pixel included in the received chunk may be used without interpolation. In some examples, interpolation module 43 may determine interpolated texture element 100' in accordance with equation set (1), below, in order (i.e., interpolation module 43 may determine A1', B1', C1', and D1' before determining A2', B2', C2', and D2').

Equation Set (1)

| | |
|---|---|
| A1' = A1 | B1' = B1 |
| A2' = 1/2A1 + 1/2B1 | B2' = 1/2B1 + 0 |
| A3' = 1/2A1 + 1/2C1 | B3' = 1/2B1 + 1/2D1 |
| A4' = 1/2A2' + 1/2C2' | B4' = 1/2B2' + 1/2D2' |
| A5' = 1/2A1 + 1/2A2' | B5' = 1/2B1 + 1/2B2' |
| A6' = 1/2A3' + 1/2C1 | B6' = 1/2B3' + 1/2D1 |
| A7' = 1/2A2' + 1/2B1 | B7' = 1/2B2' + 0 |
| A8' = 1/2A1 + 1/2A3' | B8' = 1/2B1 + 1/2B3' |
| A9' = 1/3A3' + 1/3A4' + 1/6A5' + 1/6C5' | B9' = 1/3B3' + 1/3B4' + 1/6B5' + 1/6D5' |
| A10' = 1/3A2' + 1/3A4' + 1/6A8' + 1/6B8' | B10' = 1/3B2' + 1/3B4' + 1/6B8' + 0 |
| A11' = 1/3A4' + 1/3B3' + 1/6A7' + 1/6C7' | B11' = 1/3B4' + 0 + 1/6B7' + 1/6D7' |
| A12' = 1/3A4' + 1/3C2' + 1/6A6' + 1/6B6' | B12' = 1/3B4' + 1/3D2' + 1/6B6' + 0 |
| A13' = 1/4A5' + 1/4A9' + 1/4A8' + 1/4A10' | B13' = 1/4B5' + 1/4B9' + 1/4B8' + 1/4B10' |
| A14' = 1/4A11' + 1/4C7' + 1/4A12' + 1/4B6' | B14' = 1/4B11' + 1/4D7' + 1/4B12' + 0 |
| A15' = 1/4A6' + 1/4A12' + 1/4A9' + 1/4C5' | B15' = 1/4B6' + 1/4B12' + 1/4B9' + 1/4D5' |
| A16' = 1/4A7' + 1/4A11' + 1/4A10' + 1/4B8' | B16' = 1/4B7' + 1/4B11' + 1/4B10' + 0 |
| C1' = C1 | D1' = D1 |
| C2' = 1/2C1 + 1/2D1 | D2' = 1/2D1 + 0 |
| C3' = 1/2C1 + 0 | D3' = 1/2D1 + 0 |
| C4' = 1/2C2' + 0 | D4' = 1/2D2' + 0 |
| C5' = 1/2C1 + 1/2C2' | D5' = 1/2D1 + 1/2D2' |
| C6' = 1/2C3' + 0 | D6' = 1/2D3' + 0 |
| C7' = 1/2C2' + 1/2D1 | D7' = 1/2D2' + 0 |
| C8' = 1/2C1 + 1/2C3' | D8' = 1/2D1 + 1/2D3' |
| C9' = 1/3C3' + 1/3C4' + 1/6C5' + 0 | D9' = 1/3D3' + 1/3D4' + 1/6D5' + 0 |
| C10' = 1/3C2' + 1/3C4' + 1/6C8' + 1/6D8' | D10' = 1/3D2' + 1/3D4' + 1/6D8' + 0 |
| C11' = 1/3C4' + 1/3D3' + 1/6C7' + 0 | D11' = 1/3D4' + 0 + 1/6D7' + 0 |
| C12' = 1/3C4' + 0 + 1/6C6' + 1/6D6' | D12' = 1/3D4' + 0 + 1/6D6' + 1/6B6' |
| C13' = 1/4C5' + 1/4C9' + 1/4C8' + 1/4C10' | D13' = 1/4D5' + 1/4D9' + 1/4D8' + 1/4D10' |
| C14' = 1/4C11' + 0 + 1/4C12' + 1/4D6' | D14' = 1/4D11' + 0 + 1/4D12' + 0 |
| C15' = 1/4C6' + 1/4C12' + 1/4C9' + 0 | D15' = 1/4D6' + 1/4D12' + 1/4D9' + 0 |
| C16' = 1/4C7' + 1/4C11' + 1/4C10' + 1/4D8' | D16' = 1/4D7' + 1/4D11' + 1/4D10' + 0 |

In any case, interpolation module 43 may output the graphical commands for the first frame and interpolated texture element 100' to GPU 20 which may render the first frame for output at a display of UI devices 54. In this way, sink device 6 may render the first frame without waiting to receive a fully constructed version of texture element 100.

In some examples, if the equations used to interpolate pixel values of non-edge blocks of the texture element are used to interpolate certain pixel values of blocks along the edges of the texture element, such as the bottom edge and/or the right edge, some of the equations may reference pixels at locations not included in the texture element. For instance, as shown above in equation set (1), while the equation for A2' references a pixel two locations to the left (i.e., "A1") and two locations to the right (i.e., B1), there is no pixel present two locations to the right of B2'. As such, in some examples, interpolation module 43 may use zero-value pixels when interpolating pixels that reference pixels in non-existent locations. For instance, as shown above in equation set (1), the equation for B2' uses a "0" for the value of the pixel two locations to the right of B2'. In some examples, as opposed to using a zero value, interpolation module 43 may repeat the last row and/or column of the available pixels. While in the present example, it may appear that using such placeholder values (i.e., zero-value pixels or repeated pixels) may cause visible artifacts, any disturbance will be reduced as the quantity of blocks into which the texture element is divided increases.

Streaming module 14 may assign a second chunk and a third chunk to a second stage of the plurality of stages and output, at a second time, the second stage and the graphical commands for a second frame to communication module 10 for transmission to sink device 6 via wireless communication channel 8.

Responsive to receiving, via communication module 19, the second stage of the plurality of stages and the graphical commands for the second frame, streaming module 22 may cause GPU 20 to render the second frame. For instance, streaming module 22 may output the graphical commands for the second frame and an updated interpolated version of the texture element to GPU 20. In some examples, streaming module 22 may determine the updated interpolated version of the texture element by re-interpolating pixels of the texture element represented by one or more non-received stages of the plurality of stages based on pixels of the texture element represented by the first stage, the second stage, and the third stage. In some examples, if a particular pixel is included in one of the received chunks, the value of the pixel included in the received chunk may be used without interpolation. In some examples, after receiving the first, second, and third chunks, interpolation module 43 may determine interpolated texture element 100' in accordance with equation set (2), below, in order (i.e., interpolation module 43 may determine A1', B1', C1', and D1' before determining A2', B2', C2', and D2').

Equation Set (2)

$$A1' = A1$$
$$A2' = A2$$
$$A3' = A3$$
$$A4' = 1/2A2 + 1/2C2$$
$$A5' = 1/2A1 + 1/2A2$$
$$A6' = 1/2A3 + 1/2C1$$
$$A7' = 1/2A2 + 1/2B1$$
$$A8' = 1/2A1 + 1/2A3$$
$$A9' = 1/3A3 + 1/3A4' + 1/6A5' + 1/6C5'$$
$$A10' = 1/3A2 + 1/3A4' + 1/6A8' + 1/6B8'$$
$$A11' = 1/3A4' + 1/3B3 + 1/6A7' + 1/6C7'$$
$$A12' = 1/3A4' + 1/3C2 + 1/6A6' + 1/6B6'$$
$$A13' = 1/4A5' + 1/4A9' + 1/4A8' + 1/4A10'$$
$$A14' = 1/4A11' + 1/4C7' + 1/4A12' + 1/4B6'$$
$$A15' = 1/4A6' + 1/4A12' + 1/4A9' + 1/4C5'$$
$$A16' = 1/4A7' + 1/4A11' + 1/4A10' + 1/4B8'$$
$$C1' = C1$$
$$C2' = C2$$
$$C3' = C3$$
$$C4' = 1/2C2 + 0$$
$$C5' = 1/2C1 + 1/2C2$$
$$C6' = 1/2C3 + 0$$
$$C7' = 1/2C2 + 1/2D1$$
$$C8' = 1/2C1 + 1/2C3$$
$$C9' = 1/3C3 + 1/3C4' + 1/6C5' + 0$$
$$C10' = 1/3C2 + 1/3C4' + 1/6C8' + 1/6D8'$$
$$C11' = 1/3C4' + 1/3D3 + 1/6C7' + 0$$
$$C12' = 1/3C4' + 0 + 1/6C6' + 1/6D6'$$
$$C13' = 1/4C5' + 1/4C9' + 1/4C8' + 1/4C10'$$
$$C14' = 1/4C11' + 0 + 1/4C12' + 1/4D6'$$
$$C15' = 1/4C6' + 1/4C12' + 1/4C9' + 0$$
$$C16' = 1/4C7' + 1/4C11' + 1/4C10' + 1/4D8'$$

$$B1' = B1$$
$$B2' = B2$$
$$B3' = B3$$
$$B4' = 1/2B2 + 1/2D2$$
$$B5' = 1/2B1 + 1/2B2$$
$$B6' = 1/2B3 + 1/2D1$$
$$B7' = 1/2B2 + 0$$
$$B8' = 1/2B1 + 1/2B3$$
$$B9' = 1/3B3 + 1/3B4' + 1/6B5' + 1/6D5'$$
$$B10' = 1/3B2 + 1/3B4' + 1/6B8' + 0$$
$$B11' = 1/3B4' + 0 + 1/6B7' + 1/6D7'$$
$$B12' = 1/3B4' + 1/3D2 + 1/6B6' + 0$$
$$B13' = 1/4B5' + 1/4B9' + 1/4B8' + 1/4B10'$$
$$B14' = 1/4B11' + 1/4D7' + 1/4B12' + 0$$
$$B15' = 1/4B6' + 1/4B12' + 1/4B9' + 1/4D5'$$
$$B16' = 1/4B7' + 1/4B11' + 1/4B10' + 0$$
$$D1' = D1$$
$$D2' = D2$$
$$D3' = D3$$
$$D4' = 1/2D2 + 0$$
$$D5' = 1/2D1 + 1/2D2$$
$$D6' = 1/2D3 + 0$$
$$D7' = 1/2D2 + 0$$
$$D8' = 1/2D1 + 1/2D3$$
$$D9' = 1/3D3 + 1/3D4' + 1/6D5' + 0$$
$$D10' = 1/3D2 + 1/3D4' + 1/6D8' + 0$$
$$D11' = 1/3D4' + 0 + 1/6D7' + 0$$
$$D12' = 1/3D4' + 0 + 1/6D6' + 1/6B6'$$
$$D13' = 1/4D5' + 1/4D9' + 1/4D8' + 1/4D10'$$
$$D14' = 1/4D11' + 0 + 1/4D12' + 0$$
$$D15' = 1/4D6' + 1/4D12' + 1/4D9' + 0$$
$$D16' = 1/4D7' + 1/4D11' + 1/4D10' + 0$$

As observable from above equation set (2), the pixels that depend on the second chunk and the third chunk are interpolated based on actual pixel values (i.e., as opposed to being interpolated based on interpolated values). In this way, the quality of interpolated texture element 100' determined by interpolation module 43 may continually improve with each newly received chunk until all chunks have been received and interpolated texture element 100' is identical to texture element 100. In other words, after receiving every chunk of the plurality of chunks, streaming module 22 may losslessly reconstruct texture element 100 and cause GPU 20 to render subsequent frames based on losslessly reconstructed texture element 100.

Additionally, as illustrated in FIG. 3 and observable from the above equation sets, the pixel locations that correspond to each of the plurality of chunks may be distributed throughout the blocks (i.e., as opposed to a raster scan order). By streaming chunks including pixels from distributed locations, the techniques of this disclosure may enable sink device 6 to interpolate a higher quality representation of the texture element than in the chunks includes pixels in a raster scan order. For instance, because the pixels included in the second chunk are not adjacent to the pixels included in the first chunk, sink device 6 may interpolate a more accurate representation of the texture element than if the pixels included in the second chunk were adjacent to the pixels included in the first chunk. In other words, the techniques of this disclosure enable sink device 6 to interpolate a better representation of the texture element sooner in the streaming process.

Figure 4:
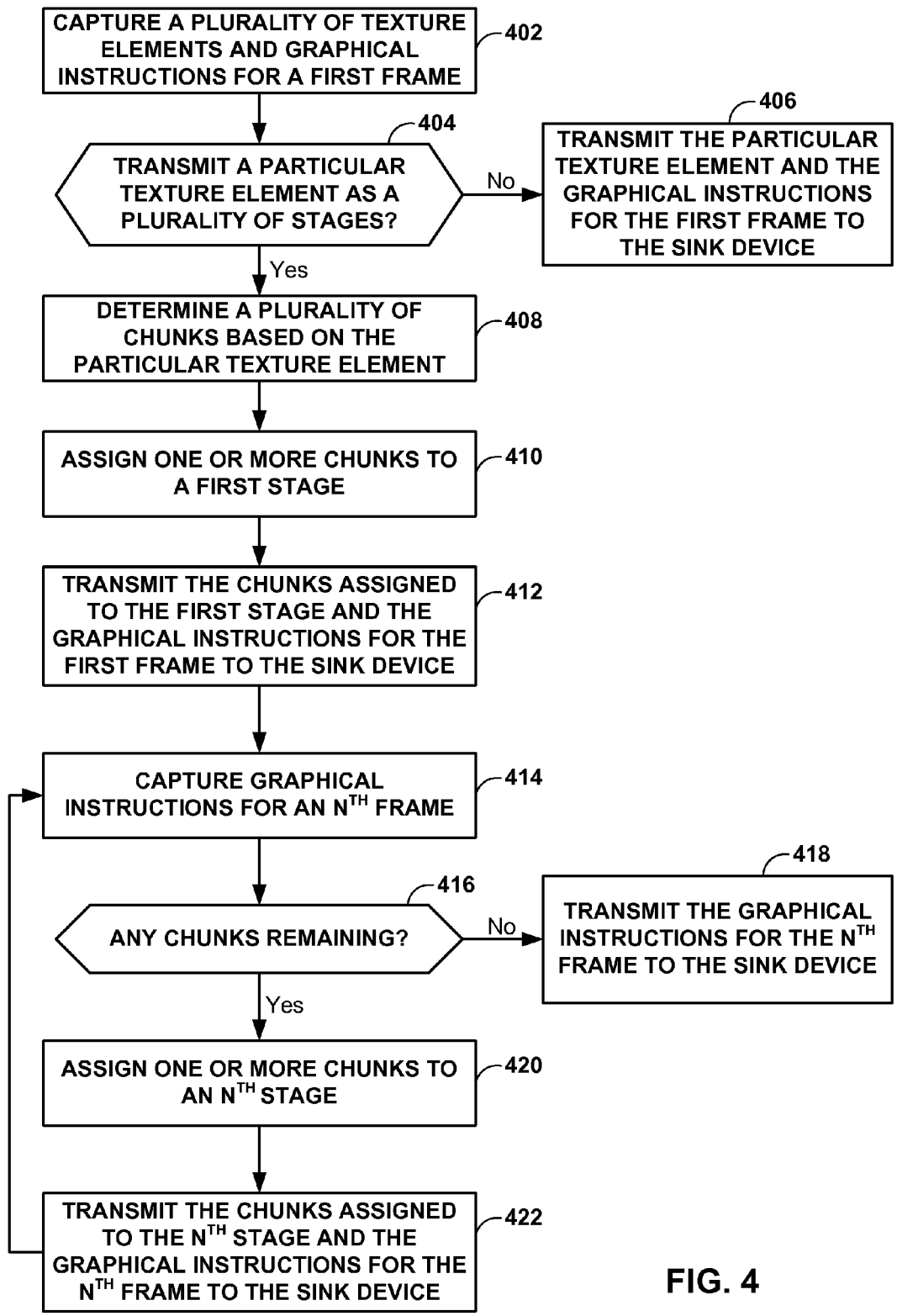
FIG. 4 is a flow diagram illustrating example operations of a source device to stream video data to a sink device, in accordance with one or more techniques of the present disclosure.

FIG. 4 is a flow diagram illustrating example operations of a source device to stream video data to a sink device, in accordance with one or more techniques of the present disclosure. The techniques of FIG. 4 may be performed by one or more processors of a computing device, such as source device 4 illustrated in FIGS. 1 and 2. For purposes of illustration, the techniques of FIG. 4 are described within the context of source device 4 illustrated in FIGS. 1 and 2, although computing devices having configurations different than that of source device 4 may perform the techniques of FIG. 4.

In accordance with one or more techniques of this disclosure, streaming module 14 of source device 4 may capture a plurality of texture elements and graphical instructions for a first frame (402). For example, streaming module 14 may capture the plurality of texture elements and graphical instructions at an input of a GPU included in source device 4.

Streaming module 14 may determine whether to transmit a particular texture element as a single unit or as a plurality of stages (404). As discussed above, streaming module 14 may determine to transmit the particular texture element as a single unit if a size of the particular texture element is less than a size threshold. In any case, if streaming module 14 determines to send the particular texture element as a single unit ("No" branch of 404), streaming module 14 may transmit the particular texture element and the graphical instructions for the first frame to a sink device, such as sink device 6 of FIGS. 1 and 2 (406). In some examples, streaming module 14 may transmit the particular texture element and the graphical instructions via a wireless communication link between source device 4 and the sink device.

If streaming module 14 determines to send the particular texture element as a plurality of stages ("Yes" branch of 404), chunking module 42 of streaming module 14 may determine a plurality of chunks based on the particular texture element (408). In some examples, chunking module 42 may determine the plurality of chunks in accordance with the techniques discussed above with reference to FIG. 3. For instance, chunking module 42 may determine eight chunks based on the particular texture element.

Staging module 44 of streaming module 14 may assign one or more chunks to a first stage (410). In some examples, staging module 44 may assign the one or more chunks to the first stage based on one or both of bandwidth of a wireless communication link between source device 4 and the sink device and a status of a buffer of the sink device. For instance, staging module 44 may assign a first chunk and a second chunk to the first stage.

Streaming module 14 may cause communication module 10 of source device 4 to transmit the chunks assigned to the first stage and the graphical instructions for the first frame to the sink device (412). In some examples, streaming module 14 may transmit the first stage and the graphical instructions via a wireless communication link between source device 4 and the sink device, such as wireless communication link 8 of FIGS. 1 and 2.

Streaming module 14 may capture a plurality of texture elements and graphical instructions for an $N^{th}$ frame (414). For example, streaming module 14 may capture the plurality of texture elements and graphical instructions at an input of a GPU included in source device 4. Streaming module 14 may then determine whether there are any chunks of the particular texture element remaining to be streamed to the sink device (416). If there are no chunks remaining to be streamed to the sink device ("No" branch of 416), streaming module 14 may transmit the graphical instructions for the Nth frame to the sink device (418).

If there are one or more chunks remaining to be streamed to the sink device ("Yes" branch of 416), staging module 44 may assign one or more of the remaining chunks to an $N^{th}$ stage (420). As discussed above, staging module 44 may assign the one or more chunks to the first stage based on one or both of the bandwidth of the wireless communication link between source device 4 and the sink device and the status of a buffer of the sink device. Streaming module 14 may transmit the chunks assigned to the $N^{th}$ stage and the graphical instructions for the $N^{th}$ frame to the sink device (422), and capture a plurality of texture elements and graphical instructions for an $N+1^{st}$ frame (414). In this way, source device 4 may reduce the peak data rate and/or enable a sink device to begin rendering frames prior to receiving every stage of the plurality of stages.

Figure 5:
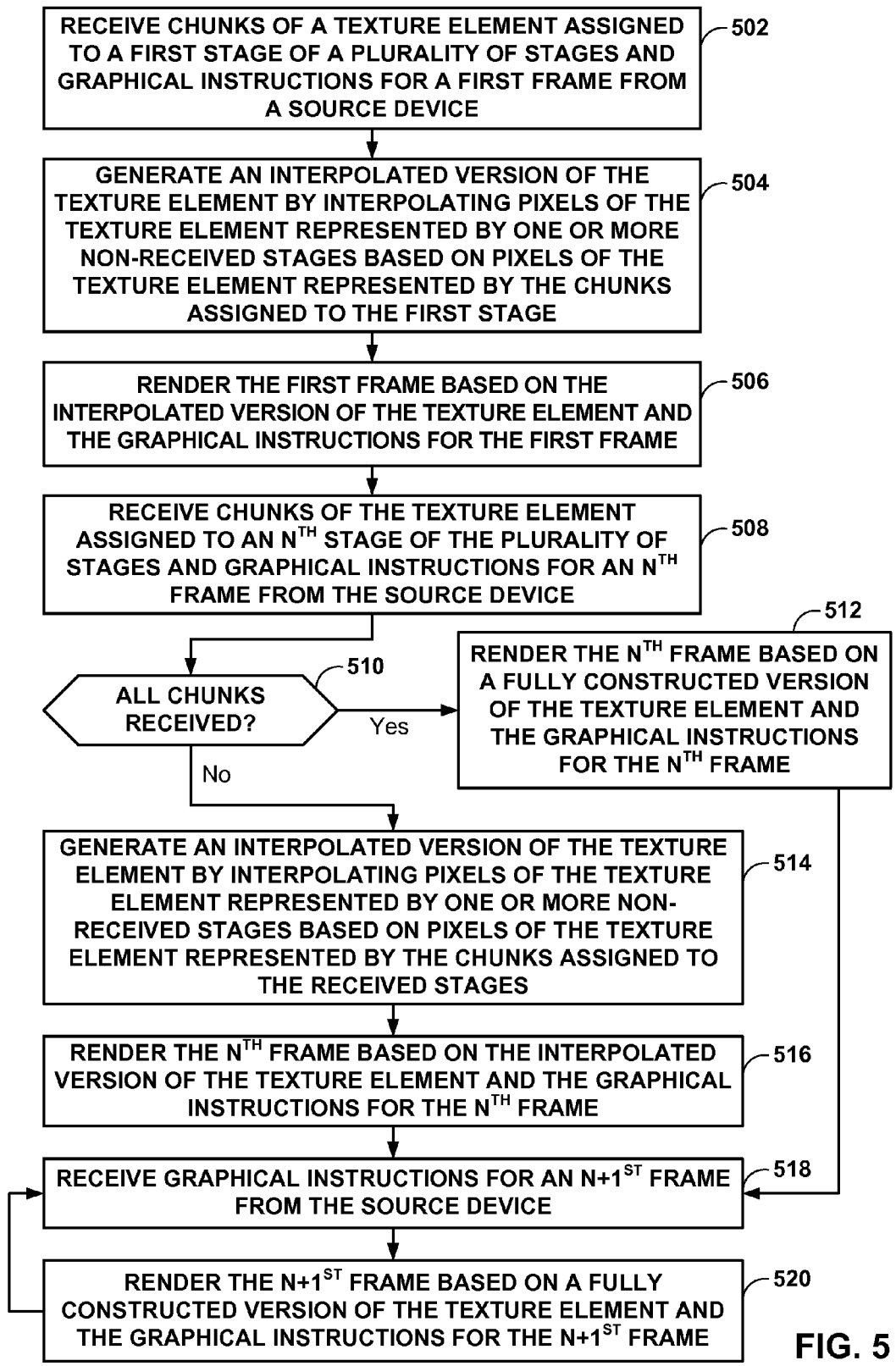
FIG. 5 is a flow diagram illustrating example operations of a sink device to receive video data streamed from a source device, in accordance with one or more techniques of the present disclosure.

FIG. 5 is a flow diagram illustrating example operations of a source device to stream video data to a sink device, in accordance with one or more techniques of the present disclosure. The techniques of FIG. 5 may be performed by one or more processors of a computing device, such as sink device 6 illustrated in FIGS. 1 and 2. For purposes of illustration, the techniques of FIG. 5 are described within the context of sink device 6 illustrated in FIGS. 1 and 2, although computing devices having configurations different than that of sink device 6 may perform the techniques of FIG. 5.

In accordance with one or more techniques of this disclosure, streaming module 22 may receive chunks of a texture element assigned to a first stage of a plurality of stages and graphical instructions for a first frame from a source device, such as source device 4 of FIGS. 1 and 2 (502). In some examples, streaming module 22 may receive the first stage and the graphical instructions via a wireless communication link between sink device 6 and the source device, such as wireless communication link 8 of FIGS. 1 and 2.

Interpolation module 43 of streaming module 22 may generate an interpolated version of the texture element by interpolating pixels of the texture element represented by one or more non-received stages based on pixels of the texture element represented by the chunks assigned to the first stage (504). For instance, interpolation module 43 may generate the interpolated version in accordance with the techniques discussed above with reference to FIG. 3.

Streaming module 22 may cause GPU 20 of sink device 6 may render the first frame based on the interpolated version of the texture element and the graphical instructions for the first frame (506). In some examples, GPU 20 may render the first frame for output at a display of UI devices 54 of sink device 6.

Streaming module 22 may receive chunks of the texture element assigned to an $N^{th}$ stage of the plurality of stages and graphical instructions for an $N^{th}$ frame from the source device (508). As discussed above, the pixel locations that correspond to the successive chunks may be distributed across blocks of the texture element as to enable sink device 6 to interpolate a higher quality version of the texture element. For instance, as illustrated in FIG. 3, for a 4×4 block with pixels numbered in raster scan order (e.g., left to right, top to bottom), the pixel locations that correspond to the chunks may be, in order, 1 (e.g., A1), 3 (e.g., A2), 9 (e.g., A3), 11 (e.g., A4), 2 (e.g., A5), 13 (e.g., A6), 4 (e.g., A7), 5 (e.g., A8), 10 (e.g., A9), 7 (e.g., A10), 12 (e.g., A11), 15 (e.g., A12), 6 (e.g., A13), 16 (e.g., A14), 14 (e.g., A15), and 8 (e.g., A16). In this way, earlier chucks may include a lower number of pixels of the image but may still include a sampling of the entire image (i.e., as opposed to just the first pixels in raster scan order).

Streaming module 22 may determine whether or not all chunks of the texture element have been received (510). If streaming module 22 determine that all chunks of the texture element have been received ("Yes" branch of 510), streaming module 22 may cause GPU 20 to render the Nth frame based on a fully constructed version of the texture element and the graphical instructions for the Nth frame (512) and receive graphical instructions for an $N+1^{st}$ frame from the source device (518).

If streaming module 22 determine that all chunks of the texture element have not been received ("No" branch of 510), interpolation module may generate an updated interpolated version of the texture element by interpolating pixels of the texture element represented by one or more non-received stages based on pixels of the texture element represented by the chunks assigned to the received stages (514). Streaming module 22 may cause GPU 20 to render the $N^{th}$ frame based on the updated interpolated version of the texture element and the graphical instructions for the $N^{th}$ frame (516).

Streaming module 22 may receive graphical instructions for an $N+1^{st}$ frame from the source device (518) and render the $N+1^{st}$ frame based on a fully constructed version of the texture element and the graphical instructions for the $N+1^{st}$ frame (520). In this way, sink device 6 may begin rendering frames prior to receiving every stage of the plurality of stages.

Figure 6:
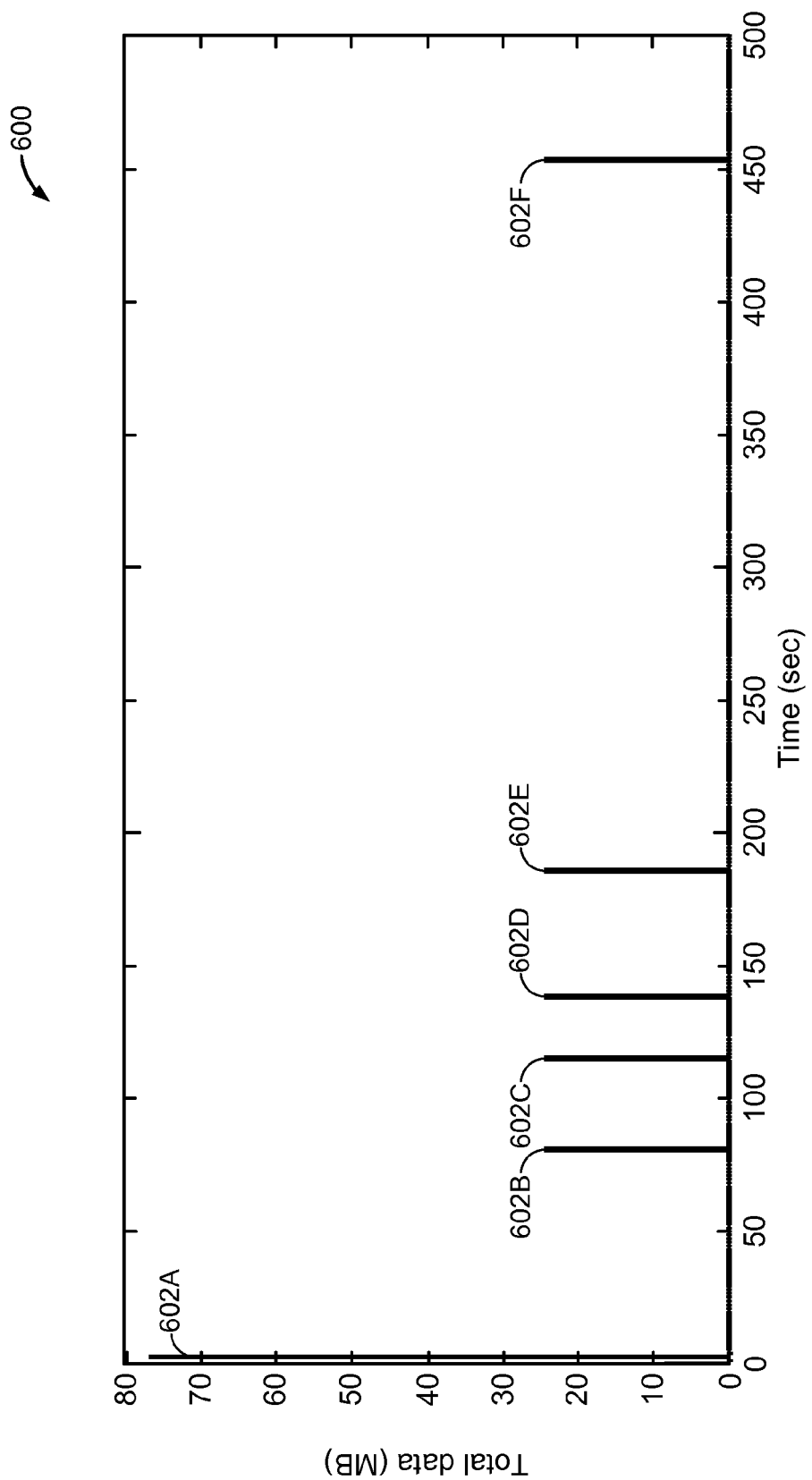
FIG. 6 is a graph illustrating a data rate as a function of time, in accordance with one more techniques of this disclosure.

FIG. 6 is a graph illustrating a data rate as a function of time, in accordance with one more techniques of this disclosure. In some example, the data rate illustrated by graph 600 of FIG. 6 may correspond to a rate at which a source device, such as source device 4 of FIGS. 1 and 2, may generate data for transfer to a sink device, such as sink device 6 of FIGS. 1 and 2, when transmitting texture elements as single units. As illustrated in FIG. 6, graph 600 includes data rate spikes 602A-602F (collectively, "data rate spikes 602").

In some examples, such as where graph 600 corresponds to the data rate of a source device streaming video data corresponding to a multi-level game (e.g., angry birds), each of data rate spikes 602 may correspond to the start of a new level where many new texture elements are needed to render frames. As discussed above, data rate spikes 602 may result in undesirable performance. For instance, a sink device may wait until all of the texture elements are completely transferred prior to rendering any frames based on the texture elements.

As discussed above, in accordance with one or more techniques of this disclosure, a source device may stream one or more texture elements in a plurality of stages and a sink device may render frames before receiving all of the stages by interpolating the texture elements based on the received stages.

Figure 7:
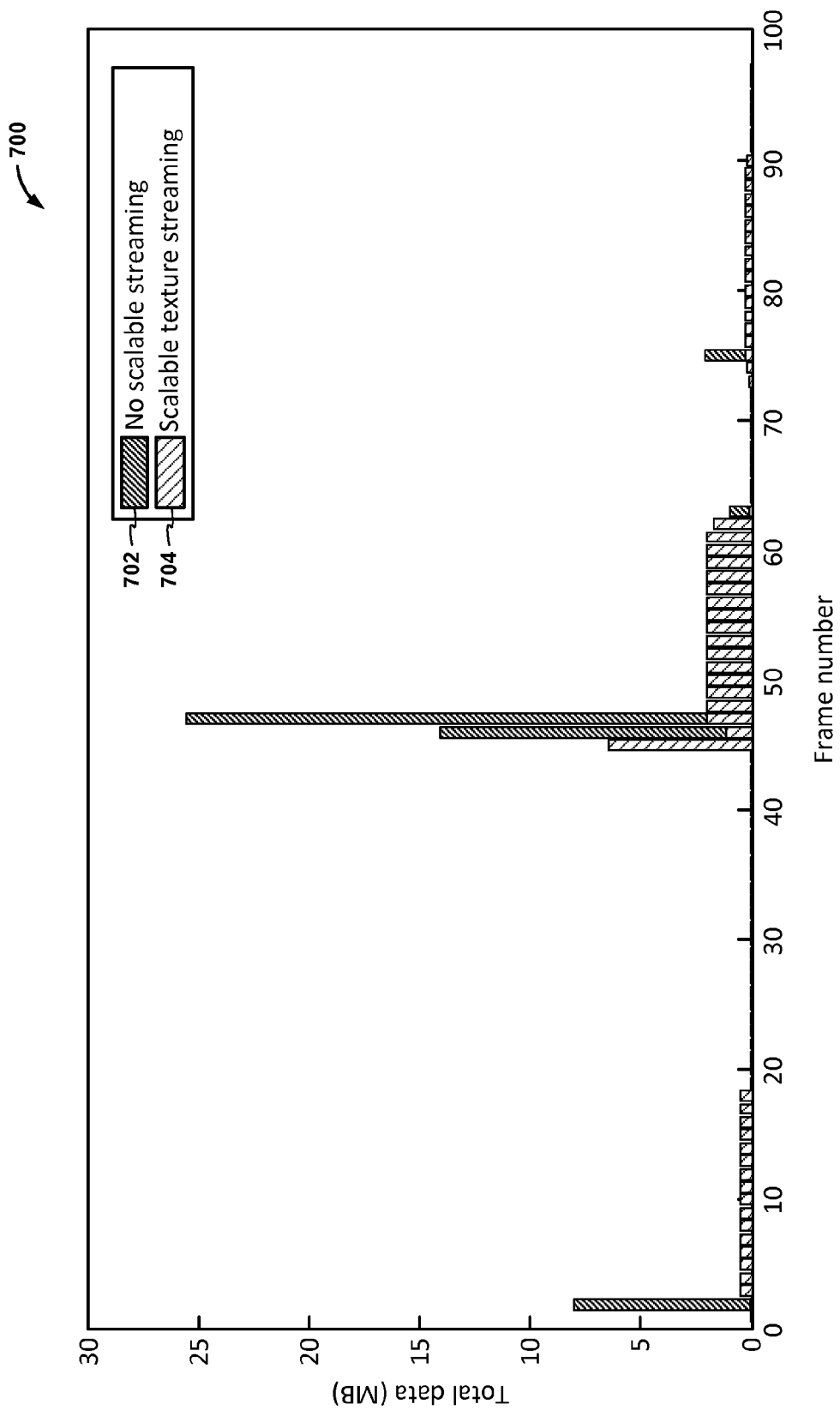
FIG. 7 is a graph illustrating two data rates as a function of frame number, in accordance with one more techniques of this disclosure.

FIG. 7 is a graph illustrating two data rates as a function of frame number, in accordance with one more techniques of this disclosure. In some example, first data rate 702 illustrated by graph 700 of FIG. 7 may correspond to a rate at which a source device, such as source device 4 of FIGS. 1 and 2 may generate data for transfer to a sink device, such as sink device 6 of FIGS. 1 and 2, when transmitting texture elements as single units. In some example, second data rate 704 illustrated by graph 700 may correspond to a rate at which a source device, such as source device 4 of FIGS. 1 and 2, may generate data for transfer to a sink device, such as sink device 6 of FIGS. 1 and 2, when transmitting texture elements as a plurality of stages.

In some examples, such as where graph 700 corresponds to the data rate of a source device streaming video data corresponding to a multi-level game (e.g., fruit ninja), each of the spikes of first data rate 702 (e.g., at frame numbers 2, 46, 47, and 75) may correspond to the start of a new level where many new texture elements are needed to render frames. As discussed above, such data rate spikes may result in undesirable performance. For instance, a sink device may wait until all of the texture elements are completely transferred prior to rendering any frames based on the texture elements.

As discussed above, in accordance with one or more techniques of this disclosure, a source device may stream one or more texture elements in a plurality of stages and a sink device may render frames before receiving all of the stages by interpolating the texture elements based on the received stages. For instance, as illustrated by second data rate 704 the texture elements that caused the spike in first data rate 702 at frame number 2 may be broken into stages and streamed over a plurality of frames (e.g., frame numbers 2-18). In this way, the techniques of this disclosure may enable a source device to stream video data with reduced peak data rates.

Figure 8:
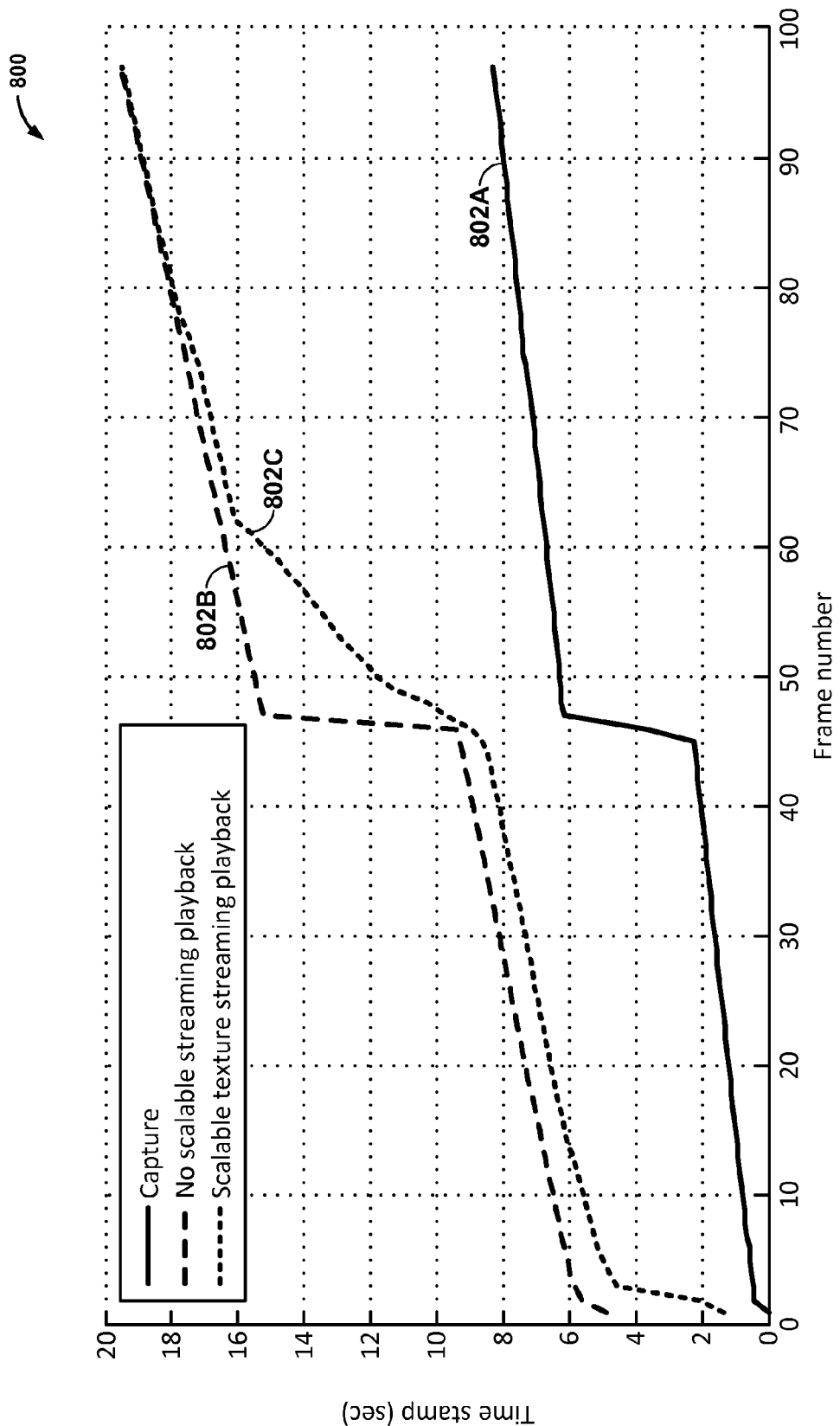
FIG. 8 is a graph illustrating event times as a function of frame number, in accordance with one more techniques of this disclosure.

FIG. 8 is a graph illustrating event times as a function of frame number, in accordance with one more techniques of this disclosure. As illustrated by FIG. 8, graph 800 includes first plot 802A, second plot 802B, and third plot 802C (collectively, "plots 802"). In some examples, each of plots 802 may indicate a time at which a particular event occurred for each frame in a system where a source device, such as source device 4 of FIGS. 1 and 2, may stream video data to a sink device, such as sink device 6 of FIGS. 1 and 2. For instance, plot 802A may indicate the times at which texture elements and graphical commands for each frame are captured; plot 802B may indicate that times at which each frame is rendered at a source device where the texture elements are transmitted as single units; and plot 802C may indicate that times at which each frame is rendered at a source device where the texture elements are streamed as a plurality of stages.

As discussed above and illustrated by plot 802B, a source device that transmits texture elements to a sink device as single units may cause the sink device to cease rendering frames until the fully constructed texture elements are received (e.g., at approximately frame number 47). In accordance with one or more techniques of this disclosure, and as illustrated by plot 802C, a source device that streams texture elements to a sink device as a plurality of stages may enable the sink device to begin rendering frames prior to receiving all of the stages (i.e., fully constructed texture elements).

The following examples may illustrate one or more aspects of the disclosure:

Example 1

A method for transmitting video data comprising: outputting, by a source device to a sink device, graphical commands and one or more texture elements that are renderable into video data, wherein outputting a particular texture element of the one or more texture elements comprises streaming, by the source device and to the sink device, a plurality of stages that each respectively correspond to a respective subset of pixels of the particular texture element.

Example 2

The method of example 1, further comprising determining the plurality of stages by at least: determining a plurality of blocks that each respectively correspond to a respective plurality of pixels of the particular texture element, wherein each block of the plurality of blocks corresponds to a same quantity of pixels; determining a plurality of chunks that each respectively correspond to a respective collocated pixel from each block of the plurality of blocks; and assigning each chunk of the plurality of chunks to a particular stage of the plurality of stages.

Example 3

The method of any combination of examples 1-2, wherein assigning each chunk of the plurality of chunks to a particular stage of the plurality of stages comprises: assigning each chunk of the plurality of chunks to a particular stage of the plurality of stages based on one or both of: channel conditions, and a status of buffer of the sink device.

Example 4

The method of any combination of examples 1-3, further comprising: outputting, at a first time by the source device and to the sink device, a first stage of the plurality of stages and graphical commands for a first frame of the video data that enable the sink device to render the first frame based on a first interpolated version of the particular texture element; and outputting, at a second time by the source device and to the sink device, a second stage of the plurality of stages and graphical commands for a second frame of the video data that enable the sink device to render the second frame based on a second interpolated version of the particular texture element.

Example 5

The method of any combination of examples 1-4, the method further comprising: outputting, at a third time by the source device and to the sink device, a final stage of the plurality of stages and graphical commands for a third frame of the video data that enable the sink device to render the third frame based on a complete un-interpolated version of the particular texture element.

Example 6

The method of any combination of examples 1-5, further comprising: responsive to determining that a size of the particular texture element is less than a size threshold, outputting the particular texture element as a single unit; responsive to determining that the size of the particular texture element is greater than the size threshold, outputting the particular texture element by streaming the plurality of stages.

Example 7

A source device comprising: a memory; one or more processors; and at least one module executable by the one or more processors to: output, to a sink device, graphical commands and one or more texture elements that are renderable into video data, wherein the at least one module is executable by the one or more processors to output a particular texture element of the one or more texture elements by at least streaming, to the sink device, a plurality of stages that each respectively correspond to a respective subset of pixels of the particular texture element.

Example 8

The source device of example 7, wherein the at least one module is further executable by the one or more processors to determine the plurality of stages by at least: determining a plurality of blocks that each respectively correspond to a respective plurality of pixels of the particular texture element, wherein each block of the plurality of blocks corresponds to a same quantity of pixels; determining a plurality of chunks that each respectively correspond to a respective collocated pixel from each block of the plurality of blocks; and assigning each chunk of the plurality of chunks to a particular stage of the plurality of stages.

Example 9

The source device of any combination of examples 7-8, wherein the at least one module is further executable by the one or more processors to assign each chunk of the plurality of chunks to a particular stage of the plurality of stages by at least: assigning each chunk of the plurality of chunks to a particular stage of the plurality of stages based on one or both of: channel conditions, and a status of buffer of the sink device.

Example 10

The source device of any combination of examples 7-9, wherein the at least one module is further executable by the one or more processors to: output, at a first time and to the sink device, a first stage of the plurality of stages and graphical commands for a first frame of the video data that enable the sink device to render the first frame based on a first interpolated version of the particular texture element; and output, at a second time and to the sink device, a second stage of the plurality of stages and graphical commands for a second frame of the video data that enable the sink device to render the second frame based on a second interpolated version of the particular texture element.

Example 11

The source device of any combination of examples 7-10, wherein the at least one module is further executable by the one or more processors to: output, at a third time and to the sink device, a final stage of the plurality of stages and graphical commands for a third frame of the video data that enable the sink device to render the third frame based on a complete un-interpolated version of the particular texture element.

Example 12

The source device of any combination of examples 7-11, wherein the at least one module is further executable by the one or more processors to: responsive to determining that a size of the particular texture element is less than a size threshold, output the particular texture element as a single unit; responsive to determining that the size of the particular texture element is greater than the size threshold, output the particular texture element by streaming the plurality of stages.

Example 13

A source device comprising means for outputting, by a source device to a sink device, graphical commands and one or more texture elements that are renderable into video data, wherein means for outputting a particular texture element of the one or more texture elements comprises means for streaming, by the source device and to the sink device, a plurality of stages that each respectively correspond to a respective subset of pixels of the particular texture element.

Example 14

The source device of example 13, further comprising means for performing any combination of the method of examples 1-6.

Example 15

A computer-readable storage medium storing instructions that, when executed, cause one or more processors of a source device to: output, to a sink device, graphical commands and one or more texture elements that are renderable into video data, wherein the instructions that cause the one or more processors to output a particular texture element of the one or more texture elements comprise instructions that cause the one or more processors to stream, to the sink device, a plurality of stages that each respectively correspond to a respective subset of pixels of the particular texture element.

Example 16

The computer-readable storage medium of example 15, further storing instructions that cause the one or more processors to perform any combination of the method of examples 1-6.

Example 17

A method for receiving video data comprising: receiving, by a sink device and from a source device, graphical commands and one or more texture elements that are renderable into video data, wherein receiving a particular texture element of the one or more texture elements comprises receiving, by the sink device and from the source device, a plurality of stages that each respectively correspond to a respective subset of pixels of the particular texture element.

Example 18

The method of example 17, further comprising rendering, by the sink device and prior to receiving every stage of the plurality of stages, frames of the video data by at least: interpolating, based on pixels of the particular texture element represented by one or more received stages of the plurality of stages, pixels of the particular texture element represented by one or more non-received stages of the plurality of stages to generate an interpolated version of the particular texture element; and rendering a frame of the video data based on the graphical commands for the first frame and the interpolated version of the particular texture element.

Example 19

The method of any combination of examples 17-18, wherein the frame is a first frame, the method further comprising: responsive to receiving an additional stage of the plurality of stages, re-interpolating the pixels of the particular texture element represented by one or more non-received stages of the plurality of stages to generate an updated interpolated version of the particular texture element; and rendering a second frame of the video data based on graphical commands for the second frame and the updated interpolated version of the particular texture element.

Example 20

The method of any combination of examples 17-19, further comprising: responsive to receiving a final stage of the plurality of stages, rendering a third frame of the video data based on graphical commands for the third frame and an un-interpolated version of the particular texture element.

Example 21

The method of any combination of examples 17-20, wherein: each stage of the plurality of stages includes one or more chunks of a plurality of chunks, each chunk of the plurality of chunks respectively corresponds to a respective collocated pixel from each block of a plurality of blocks that each correspond to a respective plurality of pixels of the particular texture element, each block of the plurality of blocks corresponds to a same quantity of pixels.

Example 22

The method of any combination of examples 17-22, wherein: a first chunk of the plurality of chunks includes a first quantity of chunks, and a second chunk of the plurality of chunks includes a second, different, quantity of chunks.

Example 23

A sink device comprising: a memory; one or more processors; and at least one module executable by the one or more processors to: receive, from a source device, graphical commands and one or more texture elements that are renderable into video data, wherein the at least one module is executable by the one or more processors to receive a particular texture element of the one or more texture elements by at least receiving, from the source device, a plurality of stages that each respectively correspond to a respective subset of pixels of the particular texture element.

Example 24

The sink device of example 23, wherein the at least one module is further executable by the one or more processors to render, prior to receiving every stage of the plurality of stages, frames of the video data by at least: interpolating, based on pixels of the particular texture element represented by one or more received stages of the plurality of stages, pixels of the particular texture element represented by one or more non-received stages of the plurality of stages to generate an interpolated version of the particular texture element; and rendering a frame of the video data based on the graphical commands for the first frame and the interpolated version of the particular texture element.

Example 25

The sink device of any combination of examples 23-24, wherein the frame is a first frame, and wherein the at least one module is further executable by the one or more processors to: responsive to receiving an additional stage of the plurality of stages, re-interpolate the pixels of the particular texture element represented by one or more non-received stages of the plurality of stages to generate an updated interpolated version of the particular texture element; and render a second frame of the video data based on graphical commands for the second frame and the updated interpolated version of the particular texture element.

Example 26

The sink device of any combination of examples 23-25, wherein the at least one module is further executable by the one or more processors to: responsive to receiving a final stage of the plurality of stages, render a third frame of the video data based on graphical commands for the third frame and an un-interpolated version of the particular texture element.

Example 27

The sink device of any combination of examples 23-26, wherein: each stage of the plurality of stages includes one or more chunks of a plurality of chunks, each chunk of the plurality of chunks respectively corresponds to a respective collocated pixel from each block of a plurality of blocks that each correspond to a respective plurality of pixels of the particular texture element, each block of the plurality of blocks corresponds to a same quantity of pixels.

Example 28

The sink device of any combination of examples 23-27, wherein: a first chunk of the plurality of chunks includes a first quantity of chunks, and a second chunk of the plurality of chunks includes a second, different, quantity of chunks.

Example 29

A sink device comprising: means for receiving, by a sink device and from a source device, graphical commands and one or more texture elements that are renderable into video data, wherein means for receiving a particular texture element of the one or more texture elements comprise means for receiving, by the sink device and from the source device, a plurality of stages that each respectively correspond to a respective subset of pixels of the particular texture element.

Example 30

The sink device of example 29, further comprising means for performing any combination of the method of examples 17-22.

Example 31

A computer-readable storage medium storing instructions that, when executed, cause one or more processors of a sink device to: receive, from a source device, graphical commands and one or more texture elements that are renderable into video data, wherein the instructions that cause the one or more processors to receive a particular texture element of the one or more texture elements comprise instructions that cause the one or more processors to receive, from the source device, a plurality of stages that each respectively correspond to a respective subset of pixels of the particular texture element.

Example 32

The computer-readable storage medium of example 31, further storing instructions that cause the one or more processors to perform any combination of the method of examples 17-22.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for transmitting video data comprising:
    outputting, by a source device to a sink device, graphical commands and one or more texture elements that are renderable into video data, wherein outputting a particular texture element of the one or more texture elements comprises:
        determining a plurality of blocks that each respectively correspond to a respective plurality of pixels of a particular texture element, wherein each block of the plurality of blocks corresponds to a same quantity of pixels;
        determining a plurality of chunks that each respectively correspond to a respective collocated pixel from each block of the plurality of blocks;
        assigning, based on one or both of channel conditions, and a status of buffer of the sink device, each chunk of the plurality of chunks to a particular stage of a plurality of stages; and
        streaming, by the source device to the sink device and based on the assignments, the plurality of stages that each respectively correspond to a respective subset of pixels of the particular texture element.

2. The method of claim 1, further comprising:
    outputting, at a first time by the source device and to the sink device, a first stage of the plurality of stages and graphical commands for a first frame of the video data that enable the sink device to render the first frame based on a first interpolated version of the particular texture element; and
    outputting, at a second time by the source device and to the sink device, a second stage of the plurality of stages and graphical commands for a second frame of the video data that enable the sink device to render the second frame based on a second interpolated version of the particular texture element.

3. The method of claim 2, the method further comprising:
    outputting, at a third time by the source device and to the sink device, a final stage of the plurality of stages and graphical commands for a third frame of the video data that enable the sink device to render the third frame based on a complete un-interpolated version of the particular texture element.

4. The method of claim 1, further comprising:
    responsive to determining that a size of the particular texture element is less than a size threshold, outputting the particular texture element as a single unit;
    responsive to determining that the size of the particular texture element is greater than the size threshold, outputting the particular texture element by streaming the plurality of stages.

5. A source device comprising:
    a memory;
    one or more processors; and
    at least one module executable by the one or more processors to:
        output, to a sink device, graphical commands and one or more texture elements that are renderable into video data, wherein the at least one module is executable by the one or more processors to output a particular texture element of the one or more texture elements by at least:
            determining a plurality of blocks that each respectively correspond to a respective plurality of pixels of a particular texture element, wherein each block of the plurality of blocks corresponds to a same quantity of pixels;
            determining a plurality of chunks that each respectively correspond to a respective collocated pixel from each block of the plurality of blocks;
            assigning, based on one or both of channel conditions, and a status of buffer of the sink device, each chunk of the plurality of chunks to a particular stage of a plurality of stages; and
            streaming, to the sink device and based on the assignments, a plurality of stages that each respectively correspond to a respective subset of pixels of the particular texture element.

6. The source device of claim 5, wherein the at least one module is further executable by the one or more processors to:
    output, at a first time and to the sink device, a first stage of the plurality of stages and graphical commands for a first frame of the video data that enable the sink device to render the first frame based on a first interpolated version of the particular texture element; and
    output, at a second time and to the sink device, a second stage of the plurality of stages and graphical commands for a second frame of the video data that enable the sink device to render the second frame based on a second interpolated version of the particular texture element.

7. The source device of claim 6, wherein the at least one module is further executable by the one or more processors to:
    output, at a third time and to the sink device, a final stage of the plurality of stages and graphical commands for a third frame of the video data that enable the sink device to render the third frame based on a complete un-interpolated version of the particular texture element.

8. The source device of claim 5, wherein the at least one module is further executable by the one or more processors to:

responsive to determining that a size of the particular texture element is less than a size threshold, output the particular texture element as a single unit;

responsive to determining that the size of the particular texture element is greater than the size threshold, output the particular texture element by streaming the plurality of stages.

9. A method for receiving video data comprising:
receiving, by a sink device and from a source device, graphical commands and one or more texture elements that are renderable into video data, wherein:
receiving a particular texture element of the one or more texture elements comprises receiving, by the sink device and from the source device, a plurality of stages that each respectively correspond to a respective subset of pixels of the particular texture element,
each stage of the plurality of stages includes one or more chunks of a plurality of chunks,
the chunks are assigned to the stages based on one or both of: channel conditions and a status of buffer of the sink device,
each chunk of the plurality of chunks respectively corresponds to a respective collocated pixel from each block of a plurality of blocks that each correspond to a respective plurality of pixels of the particular texture element, and
each block of the plurality of blocks corresponds to a same quantity of pixels.

10. The method of claim 9, further comprising rendering, by the sink device and prior to receiving every stage of the plurality of stages, frames of the video data by at least:
interpolating, based on pixels of the particular texture element represented by one or more received stages of the plurality of stages, pixels of the particular texture element represented by one or more non-received stages of the plurality of stages to generate an interpolated version of the particular texture element; and
rendering a frame of the video data based on the graphical commands for the first frame and the interpolated version of the particular texture element.

11. The method of claim 10, wherein the frame is a first frame, the method further comprising:
responsive to receiving an additional stage of the plurality of stages, re-interpolating the pixels of the particular texture element represented by one or more non-received stages of the plurality of stages to generate an updated interpolated version of the particular texture element; and
rendering a second frame of the video data based on graphical commands for the second frame and the updated interpolated version of the particular texture element.

12. The method of claim 11, further comprising:
responsive to receiving a final stage of the plurality of stages, rendering a third frame of the video data based on graphical commands for the third frame and an un-interpolated version of the particular texture element.

13. The method of claim 9, wherein:
a first chunk of the plurality of chunks includes a first quantity of chunks, and
a second chunk of the plurality of chunks includes a second, different, quantity of chunks.

14. A sink device comprising:
a memory;
one or more processors; and
at least one module executable by the one or more processors to:
receive, from a source device, graphical commands and one or more texture elements that are renderable into video data, wherein:
the at least one module is executable by the one or more processors to receive a particular texture element of the one or more texture elements by at least receiving, from the source device, a plurality of stages that each respectively correspond to a respective subset of pixels of the particular texture element,
each stage of the plurality of stages includes one or more chunks of a plurality of chunks,
the chunks are assigned to the stages based on one or both of: channel conditions and a status of buffer of the sink device,
each chunk of the plurality of chunks respectively corresponds to a respective collocated pixel from each block of a plurality of blocks that each correspond to a respective plurality of pixels of the particular texture element, and
each block of the plurality of blocks corresponds to a same quantity of pixels.

15. The sink device of claim 14, wherein the at least one module is further executable by the one or more processors to render, prior to receiving every stage of the plurality of stages, frames of the video data by at least:
interpolating, based on pixels of the particular texture element represented by one or more received stages of the plurality of stages, pixels of the particular texture element represented by one or more non-received stages of the plurality of stages to generate an interpolated version of the particular texture element; and
rendering a frame of the video data based on the graphical commands for the first frame and the interpolated version of the particular texture element.

16. The sink device of claim 15, wherein the frame is a first frame, and wherein the at least one module is further executable by the one or more processors to:
responsive to receiving an additional stage of the plurality of stages, re-interpolate the pixels of the particular texture element represented by one or more non-received stages of the plurality of stages to generate an updated interpolated version of the particular texture element; and
render a second frame of the video data based on graphical commands for the second frame and the updated interpolated version of the particular texture element.

17. The sink device of claim 16, wherein the at least one module is further executable by the one or more processors to:
responsive to receiving a final stage of the plurality of stages, render a third frame of the video data based on graphical commands for the third frame and an un-interpolated version of the particular texture element.

18. The sink device of claim 14, wherein:
a first chunk of the plurality of chunks includes a first quantity of chunks, and
a second chunk of the plurality of chunks includes a second, different, quantity of chunks.

* * * * *